(12) United States Patent
Mischler et al.

(10) Patent No.: US 6,629,779 B1
(45) Date of Patent: Oct. 7, 2003

(54) LINEAR DISPLACEMENT GUIDE

(75) Inventors: Ernst Mischler, Roggwil (CH); Heinz Rotzetter, Aarwangen (CH)

(73) Assignee: Schneeberger Holding AG, Roggwil (CH)

(*) Notice: Subject to any disclaimer, the term of this patent is extended or adjusted under 35 U.S.C. 154(b) by 0 days.

(21) Appl. No.: 09/869,261

(22) PCT Filed: Dec. 21, 1999

(86) PCT No.: PCT/CH99/00613
§ 371 (c)(1),
(2), (4) Date: Jun. 27, 2001

(87) PCT Pub. No.: WO00/39472
PCT Pub. Date: Jul. 6, 2000

(30) Foreign Application Priority Data

Dec. 28, 1998 (CH) ................................. 2577/98

(51) Int. Cl.⁷ .............................. F16C 29/06
(52) U.S. Cl. .......................... 384/15; 384/44
(58) Field of Search .................. 384/15, 42, 43, 384/44, 45

(56) References Cited

FOREIGN PATENT DOCUMENTS

| DE | 195 24 810 | 1/1997 |
| DE | 196 15 075 | 10/1997 |
| EP | 0 731 283 | 9/1996 |

*Primary Examiner*—Lenard A. Footland
(74) *Attorney, Agent, or Firm*—Venable LLP; Norman N. Kunitz (57) ABSTRACT

A linear displacement guide, comprising a guide rail and slide that is supported via roller elements on the guide rail. The guide rail contains a groove extending essentially in longitudinal direction and through openings that can be covered for fastening the guide rail, wherein at least one of the through openings is located in the groove region. The linear displacement guide is provided with a covering means to be arranged on and secured to the guide rail to permit a simple and tolerance-insensitive assembly. The invention suggests securing the covering means, designed as cover band (4), on the guide rail. The cover band should comprise a center section (20) and two adjoining clamping legs (21), which are angled relative to the center section (20), wherein the cover band (4) can be fastened to the guide rail (1) by fitting the two clamping legs against the side walls (15) of groove (14).

17 Claims, 7 Drawing Sheets

LINEAR DISPLACEMENT GUIDE

BACKGROUND OF THE INVENTION

The invention relates to a linear displacement guide, comprising a guide rail and a slide supported via roller elements on the guide rail, with the guide rail being provided with a groove extending essentially in a longitudinal displacement direction and being provided with through openings for screws to fasten the rail, wherein the linear displacement guide is provided with a cover means to be arranged on the guide rail, and which can be secured to the guide rail to cover the through openings in the region of the groove. The cover means is designed to be a cover band with a center section and two adjoining clamping legs that are angled relative to the center section. The cover band can be attached to the guide rail by fitting the two clamping legs against the side walls of the groove and the cover band rests with the edge regions outside of the groove on a top surface of the rail.

Linear displacement guides of this type are used for the straight-line guidance of machine components, for example as required for the movement of the translational shafts in a machine tool. Even though the linear guides are frequently used in an extremely dirty environment and under unfavorable conditions, e.g. high temperatures, they are expected to be highly precise. Preventing the roller elements from becoming dirty is one essential precondition since this adversely affects the wear and the guidance accuracy.

For that and other reasons, seals are frequently installed on the fronts of the slides. These seals glide along the top surface and the side surfaces of the rail and, in the process, strip the dirt from the rail. This operation is designed to prevent the dirt from reaching the carriage inside.

In order to fasten the guide rails to a support, these are provided with through bores extending orthogonal to their top surfaces, which are designed to accommodate fastening elements such as screws. Since the fastening elements as a rule do not completely fill the through bores, dirt is often deposited there, which frequently enters the carriage inside despite the sealing lips. In addition, edges are formed on the surface because of the bores. If the sealing lips are guided directly over these edges, it can result in additional wear of the sealing lips. Dust and dirt furthermore easily collects along the edges, which cannot be removed reliably with the sealing lips and eventually damages the sealing lips.

Numerous types of covers for the through bores are already known for avoiding this type of dirt accumulation.

Thus, it is known to press plastic caps into the through bores, which are aligned with the surface of the guide rail. Another type of cover is disclosed in German Reference A 38 12 505 where the guide rail is provided on the surface with a longitudinal groove into which a plate in the shape of a strip is inserted.

A cover band with two legs is proposed in German Reference 43 11 641 C 1, which legs together with the center section respectively enclose a bending angle of preferably 70°. The two legs are intended to engage in undercuts in side surfaces of the guide rail. Since the undercut angles for the rail are larger than the bending angles, it is designed to effect a resilient contact pressure of the cover band against the rail. One disadvantage of this linear displacement guide is that it must meet relatively high requirements with respect to the production accuracy of the cover band. If the bending angle is too small, then the cover band is not securely fixed in place. If the bending angle is too large, the danger exists that the band can no longer be installed on the rail or only with great difficulty.

A two-part cover band is disclosed in German Reference 195 24 810 A1, which is to be inserted into a longitudinal groove of a guide rail. For this, a lower portion of the cover band engages in the groove and is clamped with side holding bars against the edges of the groove. The upper part of the cover band is inserted into a broad upper portion of the groove and is designed to be flush with the top of the rail, so that a top surface which is on the whole flat is formed. This solution also poses high requirements to the production accuracy of the linear displacement guide, in particular for fitting the upper part of the cover band exactly into the groove.

Thus, it is the object of the invention to create a cover for a linear displacement guide, which is designed to cover the openings for securing the rail and is not critical with respect to production tolerances, but should still ensure a secure covering.

SUMMARY OF THE INVENTION

The above object generally is achieved according to a first aspect of the invention by a linear displacement guide, comprising a guide rail and a slide supported via roller elements on the guide rail, with the guide rail being provided with a groove extending essentially in a longitudinal displacement direction and with through openings for screws to fasten the rail, wherein the linear displacement guide is provided with a cover means to be arranged on the guide rail, and which can be secured to the guide rail to cover the through openings in the region of the groove. The cover means is designed to be a cover band with a center section and two adjoining clamping legs, which are angled relative to the center section, and the cover band can be attached to the guide rail by fitting the two clamping legs against the side walls of the groove and the cover band resting with the edge regions outside of the groove on a top surface of the rail.

The above object generally is achieved according to a second aspect of the invention by a linear displacement guide, comprising a guide rail and slide supported via roller elements on the guide rail, with the guide rail being provided with a groove extending essentially in a longitudinal displacement direction and through openings for screws to fasten the rail, and the linear displacement guide is provided with a cover means to be arranged on the guide rail, and which can be secured to the guide rail to cover the through openings in the region of the groove. The cover means is designed to be a cover band with a center section and two adjoining clamping legs, which are angled relative to the center section; and the cover band can be attached to the guide rail by fitting the two clamping legs against the side walls of the groove. The center section of the cover band to be inserted into the groove is provided with a curved section that is directed away from the groove.

The cover band for the linear displacement guides according to the invention, which covers the complete groove, should be fastened inside the groove by "snap-together fastening" between the wall surfaces of the groove in the guide rail on the one hand and the clamping legs of the cover band on the other hand. It is particularly favorable if the snap-together fastening causes an at least slight elastic deformation of the center section in the form of a curvature. The curvature preferably should be convex, meaning pointing away from the groove. It may also be useful if the length of the bendable center section amounts to a multiple of the clamping leg length. In that case, larger production tolerances of the groove or cover band can lead to differently large elastic deformations of the center section. However, the operation of the linear guide is not hampered because even larger tolerances lead only to a relatively slight additional lift or deflection owing to the geometric conditions.

The cover band according to another preferred embodiment can comprise two parts, consisting of at least two sheet metal strips. The two sheet metal strips can be connected with suitable connecting techniques, e.g. gluing, soldering or welding. One cover strip is preferably arranged above a fastening strip and rests on one surface of the rail top. The clamping legs are provided on the fastening strip that is narrower as compared to the cover strip.

In addition, it has proven advantageous if at least some sections, preferably however the partial surfaces on the rail top on both sides of the groove, are inclined respectively toward the adjoining side surfaces of the rail. As a result, the rail can be produced with fewer processing steps, in particular fewer grinding steps, than previously required since respectively one side surface and one partial surface of the rail can be processed simultaneously in one operation. In addition and owing to the resulting shape of the rail, fluid that may hit the rail, e.g. cooling water, can flow off particularly well. A rail of this type is preferably provided with a cover band, the legs of which are angled as compared to the center section of the cover band. The legs can fit flat against the partial surfaces of the rail top.

According to another preferred embodiment of the linear displacement guide according to the invention, the cover band rests on the partial surfaces of the rail top, which respectively follow the groove on the sides. By varying the size of the partial surfaces that are covered by the cover band, production tolerances of the groove and/or cover band can be compensated, thus making the linear guide according to the invention less sensitive to tolerances.

Additional preferred embodiments of the invention follow from the disclosure below.

The invention is explained in further detail with the aid of the exemplary embodiments shown schematically in the Figures.

DETAILED DESCRIPTION OF INVENTION

Figure 1:
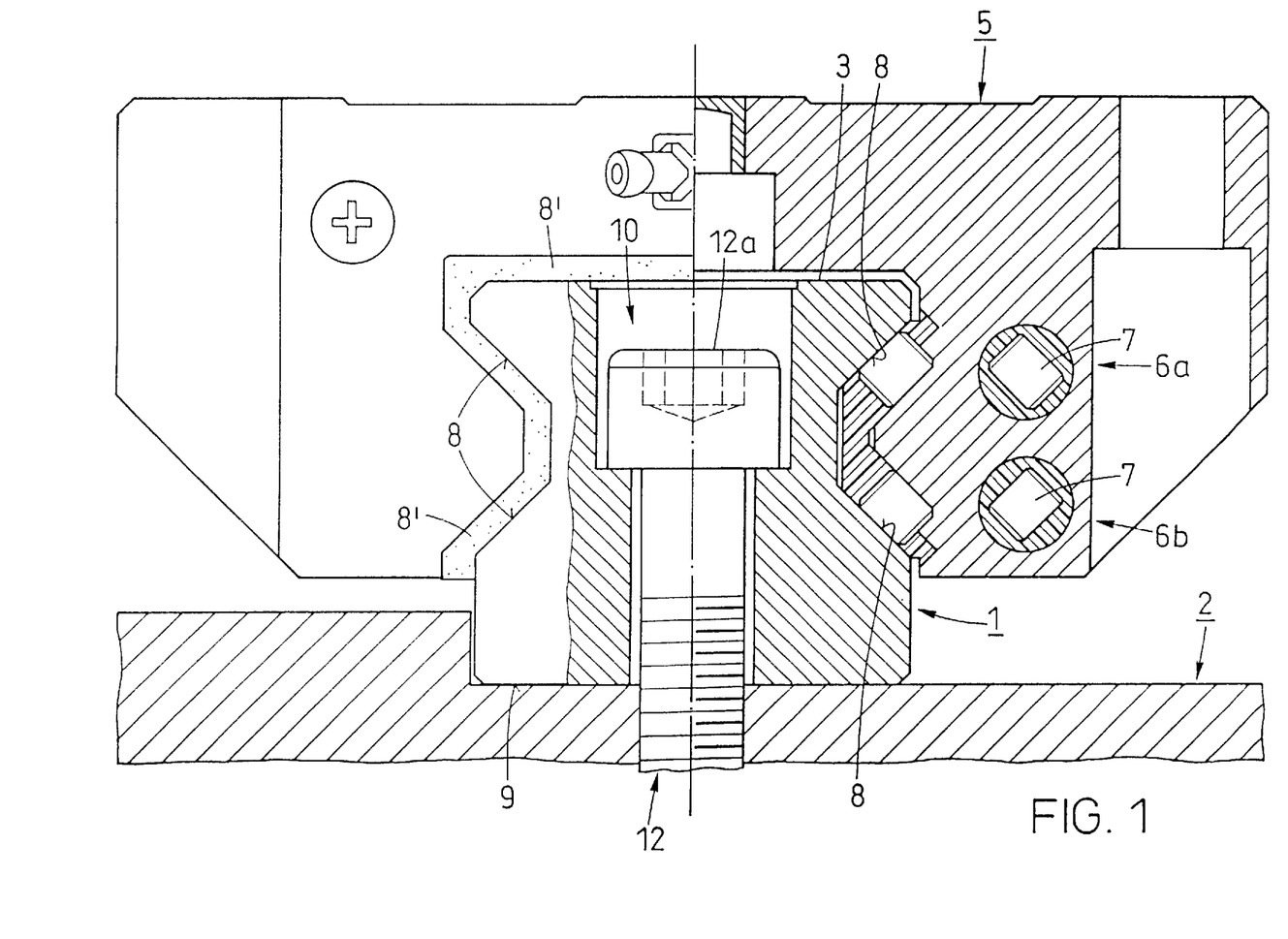
FIG. 1 is a partial cross-sectional representation of a linear displacement guide according to the invention that is mounted on a support, shown in the region of a through bore.

FIG. 1 shows a linear displacement guide with profiled guide rail 1, shown in part as a sectional representation, which is fastened on a support 2. A cover band 4 is to be mounted on a top surface 3 of guide rail 1, which extends parallel to the longitudinal displacement direction, meaning perpendicular to the drawing plane. However, this cover band is not shown in FIG. 1. It is furthermore shown that a slide 5 with essentially U-shaped cross section is supported on the guide rail 1, so that this slide can move along the guide rail 1.

The slide is supported via roller bearings 7, arranged inside four closed circuits 6a, 6b, on slanted side support surfaces 8 of the guide rail 1. In the partial sectional representation of FIG. 1, however, only the circuits in one of the two legs are shown. Respectively one sealing lip 8 is arranged on both fronts of the slide 5, along the outline of the U-shaped recess, which sealing lip fits flush against the guide rail 1 and the cover band 4. This contributes to preventing dirt from entering the circuits 6a, 6b.

FIG. 1 furthermore shows one of at least two through bores 10 in the guide rail 1, which through bore extends from the top surface 3 to a supporting surface 9. A screw 12 is arranged inside this through bore, such that the screw head 12a is completely submerged inside the guide rail 1. The screw 12 as fastening means functions to secure the guide rail 1 on the support 2.

Figure 2:
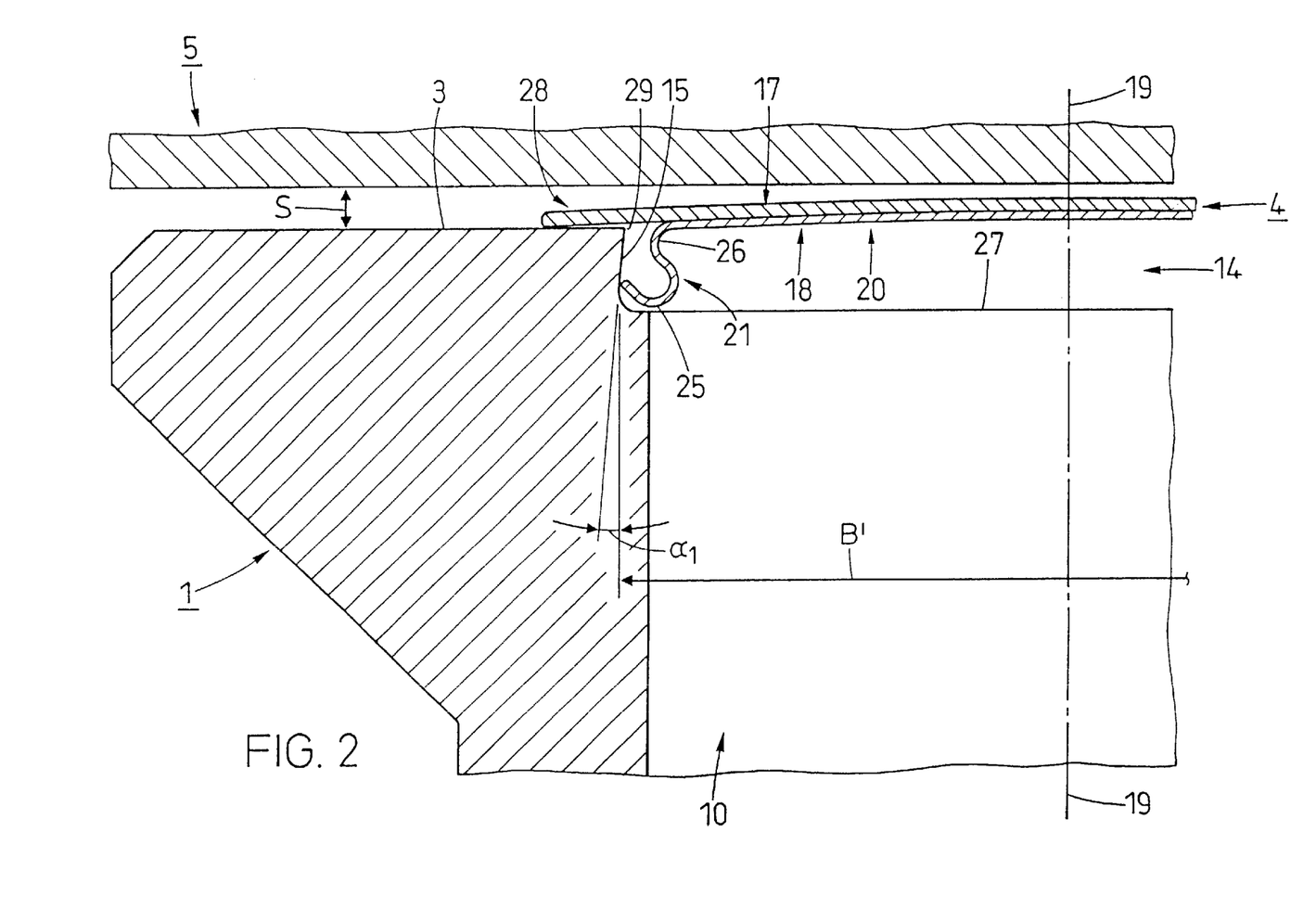
FIG. 2 is an enlarged partial view of a first cover band, fastened on the guide rail shown in FIG. 1.

FIG. 2 shows the guide rail 1 and the first cover band 4 according to the invention in a representation that is enlarged as compared to the FIG. 1. As can be seen in FIG. 2, the dove-tailed cross section of groove 14 in the exemplary embodiment shown is slightly wider than the width of the through bore 10. Two side walls 15 of groove 14 together with a vertical line enclose an angle of inclination ($\alpha_1$), so that respectively one undercut forms on the side surfaces 15. The angle of inclination ($\alpha_1$) can amount to 4° for example.

The first exemplary embodiment of cover band 4, shown in FIG. 2, comprises an upper cover strip 17 and a fastening strip 18, arranged underneath. The two strips 17, 18 are fixedly connected through soldering, gluing or welding, so that the cover band is mirror-symmetrical with respect to a symmetry plane 19 that extends parallel to the longitudinal displacement direction of the slide. Both strips 17, 18 consist of a spring-elastic, preferably identical band material, which can be selected from a thickness range of 0.2 mm to 0.6 mm. The cover strip 17 advantageously should be slightly thicker than the fastening strip 18, for example in the range of 0.05 to 0.3 mm. As a result, it can be achieved that both strips elastically deform when installed, but that the fastening strip 18 experiences a stronger deformation than the cover strip. As a result, relatively high spring or holding forces can build up. Despite the bending of the center section 20 of the cover band in the direction of slide 5, the operational safety of the linear displacement guide is not reduced by the curvature of the cover band. The bending line of the cover band extends in a gap S between the top 3 of the rail and the slide 5, without touching the latter.

The cover strip 17 (in the non-stressed condition) is an essentially flat sheet metal strip with a larger width than the width of groove 14. As a result, the cover band rests with its two side edges extending in longitudinal direction on a top surface of the guide rail 1. The side edges of the cover strip can be rounded off to keep the wear of the sealing lips or strippers on the carriage as low as possible.

The fastening strip 18, produced through deformation of the sheet metal, has a center section 20, which is followed on both sides by a bent clamping leg 21. The width of center section 20 is slightly less than the width B' of the groove. The clamping leg 21, shown in FIG. 2, has an essentially S-shaped form, while the other clamping leg has a mirror symmetrical cross-section. Thus, the free end of the respective clamping leg is provided with an arc, in particular a circular arc 25. In the exemplary embodiment shown, this circular arc 25 extends approximately over 180°. An additional circular arc 26 of the clamping leg 21 is formed between this circular arc and the center section 20 and extends approximately over 140°, wherein its curvature points toward the opposite-arranged clamping leg.

In the non-stressed condition (not shown herein), a total width for the fastening strip 18 is at least slightly wider than the widest width B' of groove 14, which exists in the area of a groove bottom 27.

With one of several possible installation sequences, one of the two clamping legs 21 of cover band 4 can initially be fitted over its total length (meaning as seen in longitudinal displacement direction, which is perpendicular to the drawing plane in FIG. 2), against a side wall 15 of the groove 14. As a result, the cover band 4 rests with an edge area 28 on the top surface 3 of the guide rail. The other clamping leg is subsequently also pressed into the groove 14. Since the total width of the fastening strip 18 is wider than the width of groove 14, the clamping leg 21 must be elastically deformed for this. Owing to the previously described cross-sectional shape of clamping legs 21, this occurs above all in the transition region between the center section 20 and the clamping leg 21, as well as in the transition region for the two circular-arc shaped curvatures. Since the pressure also acts upon the other clamping leg, this clamping leg also begins to deform in the same way. As soon as the free end of the clamping leg that must still be inserted has passed over an edge 29 between the top surface 3 and the side wall 15, the two clamping legs again start to relax slightly.

For another installation option, the cover band 4 is inserted from one front side of the rail into the groove. If the spring forces of the legs are too high for this, stress can be removed from one or the other of the legs through alternately pressing the band against the left or right wall on the side of the groove, thus making an advance possible.

The cover band 4 is mounted on the guide rail 1 as soon as both edge regions 28 rest on the top surface 3, essentially over the complete length of the rail outside of the groove. In this end position, the cover strip 17 as well as the center section 20 can have a contour with slight curvature, as shown in FIG. 2. This curvature is created through the elastic deformation of the clamping legs 21. Tolerances in the mass for groove and cover band above all result in a variation in the size of the curvature in the center section and thus also the cover strip. However, such tolerances are acceptable since even larger tolerances lead only to relatively small increases and decreases in the size of the convex curvature. The non-problematic guidance of the carriage on the guide rail is not affected by this any more than the operation of the stripper.

Figure 3:
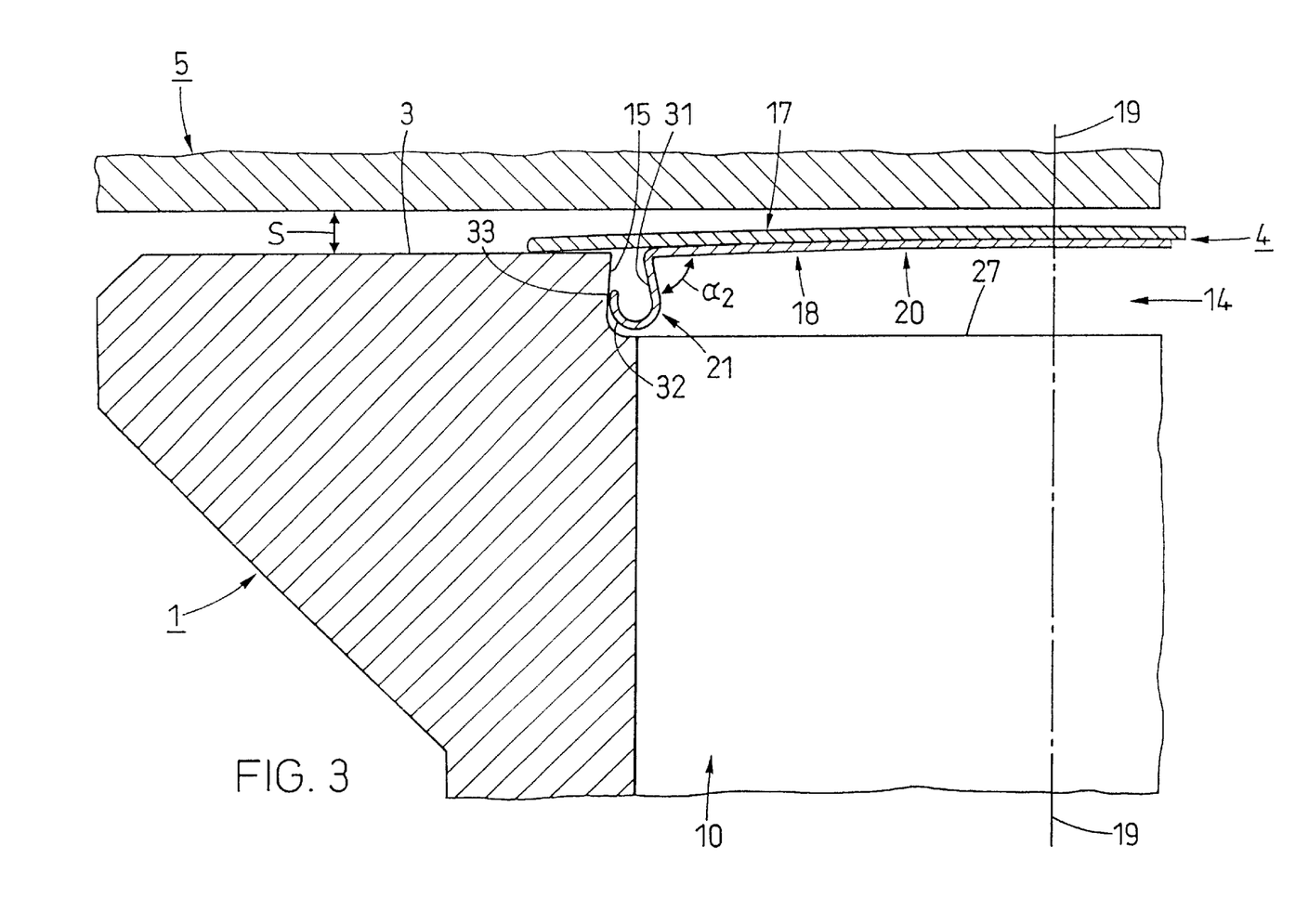
FIG. 3 illustrates another cover band according to the invention, in a representation according to FIG. 2.

FIG. 3 shows an additional exemplary embodiment of a linear guide according to the invention. The linear guide that is otherwise identical to the embodiment shown in FIG. 2 primarily differs from this embodiment by a different cross-sectional shape of the clamping legs 15. These clamping legs have an essentially flat segment 31, which adjoins the center section 20. The free end of the respective clamping leg 21 is again formed by an end section 32 with circular arc, so that a side edge 33 of the fastening strip rests against the side wall 15 of the groove and points toward the top of guide rail 1. FIG. 3 shows that the flat section 31 of clamping leg 21 in the fully assembled state encloses a sharp angle ($\alpha_2$), e.g. 85°, together with the center section 20. In the same way as for the previously discussed exemplary embodiment, holding forces act upon the side walls 15. By selecting suitable materials for the fastening strip 18 and the guide rail 1, as well as the undercut angle ($\alpha_1$), it is ensured that they are self-locking.

Figure 4:
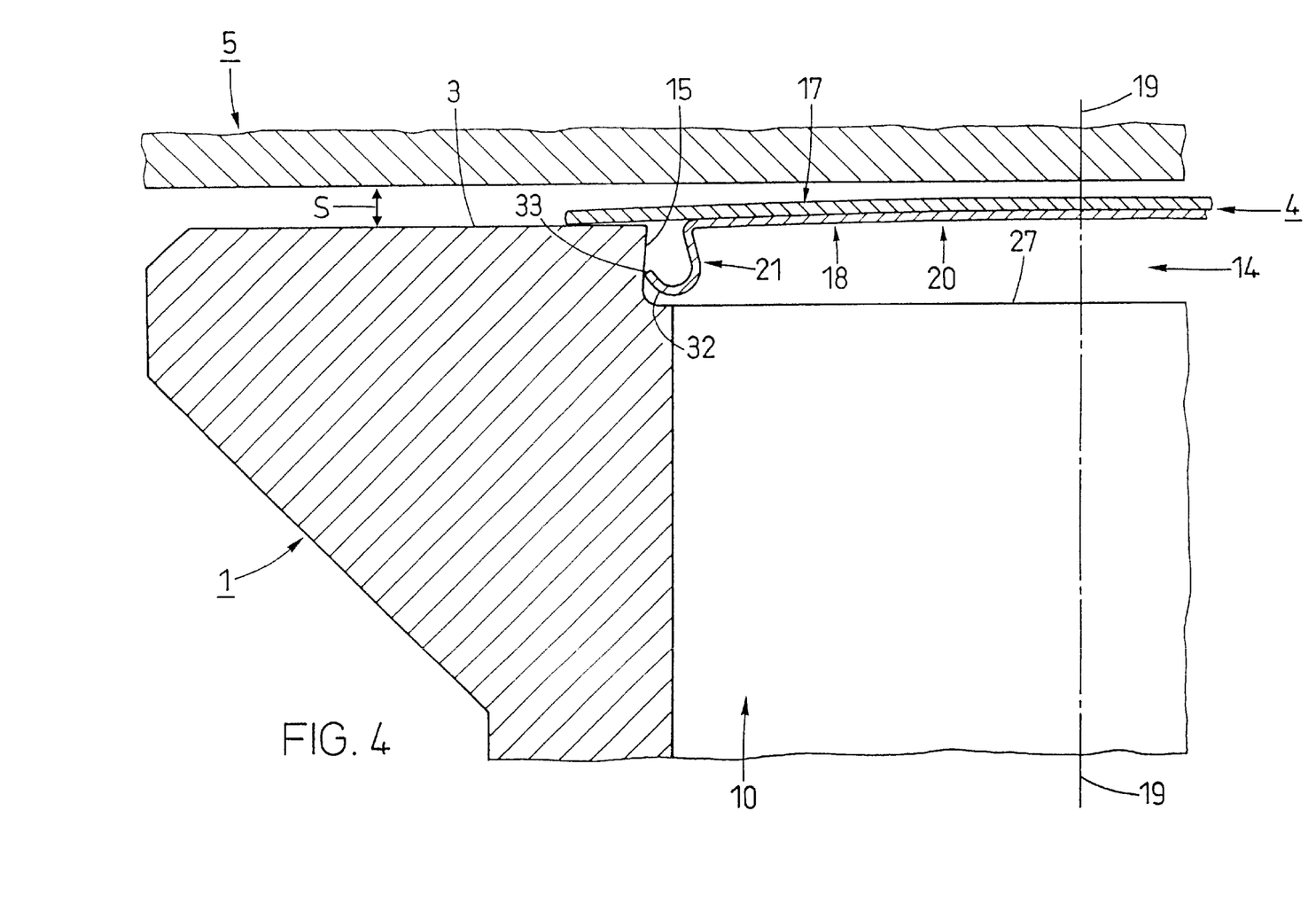
FIG. 4 illustrates a further cover band according to the invention in a representation according to FIG. 2.

FIG. 4 shows another linear displacement guide according to the invention, provided with a guide rail 1. Essentially, this linear displacement guide differs from the embodiment shown in FIG. 3 only in that the circular arc is followed in the end section 32 of the respective clamping leg 21 by another straight-line section on which the side edge 33 of the fastening strip is located. As a result, one side edge 33 of the fastening strip fits against the side wall 15 of the groove and points upward at a slant toward the top surface 3.

Figure 5:
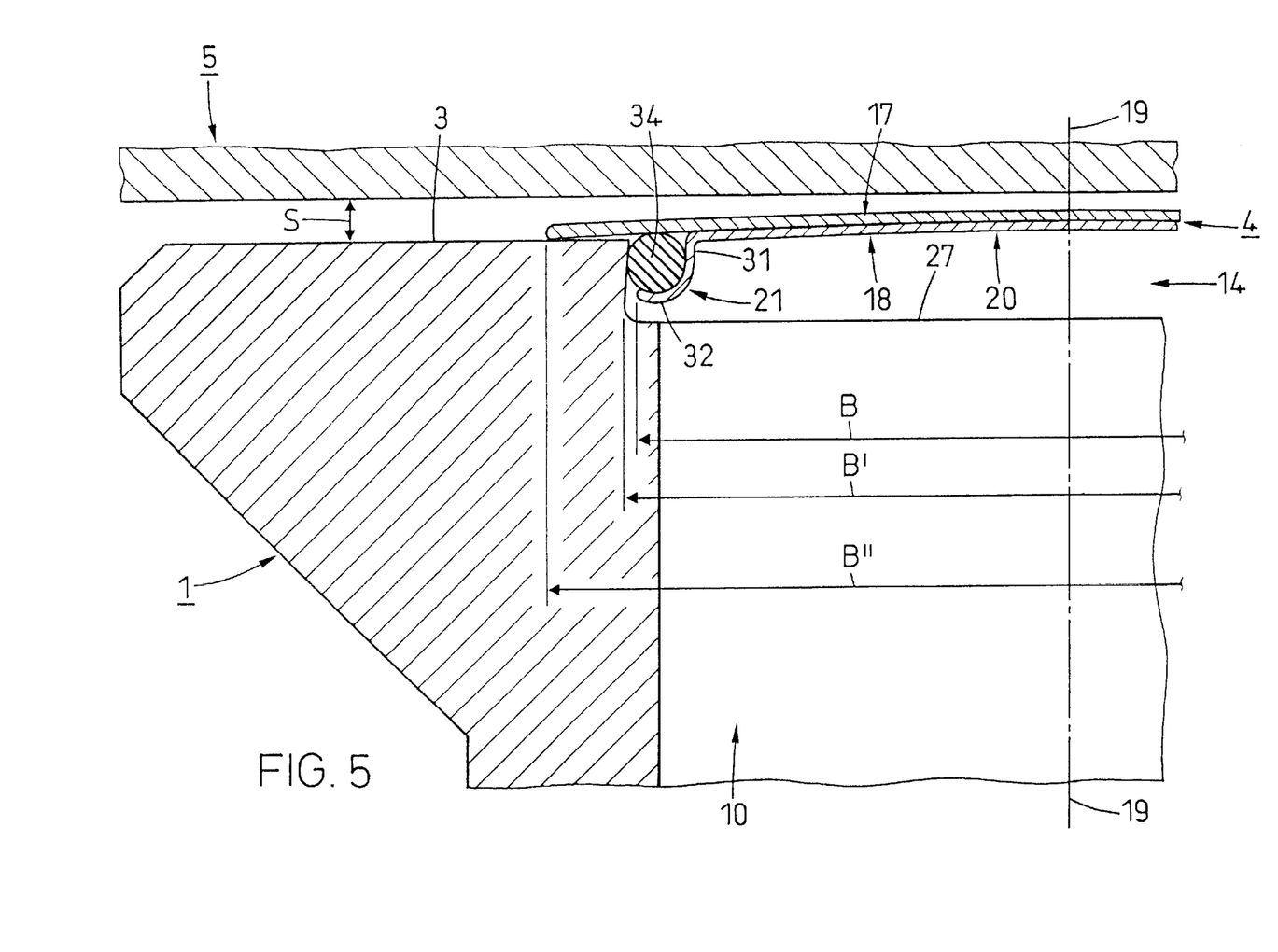
FIG. 5 shows still another cover band according to the invention in a representation according to FIG. 2.

FIG. 5 shows an embodiment where a total width B of the fastening strip 18 is less than a width B' of the groove 14. A total width B" of the cover band, on the other hand, is wider than the width B' of the groove. In addition, the circular-arc shaped end section 32 of clamping leg 21 has a smaller circular arc than that for the previously discussed embodiments, for example a circular arc of approximately 100°. In order to generate clamping forces, an essentially circular and elastically deformable rubber seal 34 is inserted at this location into the circular arc of each clamping leg. The total width resulting from the fastening strip 18 and the two rubber seals 34 is wider than the width of groove 14. The clamping forces therefore are primarily generated through the deformation of rubber seals 34. The latter have the additional advantage that no liquid can enter between the fastening strip 18 and the groove bottom 27.

Figure 6:
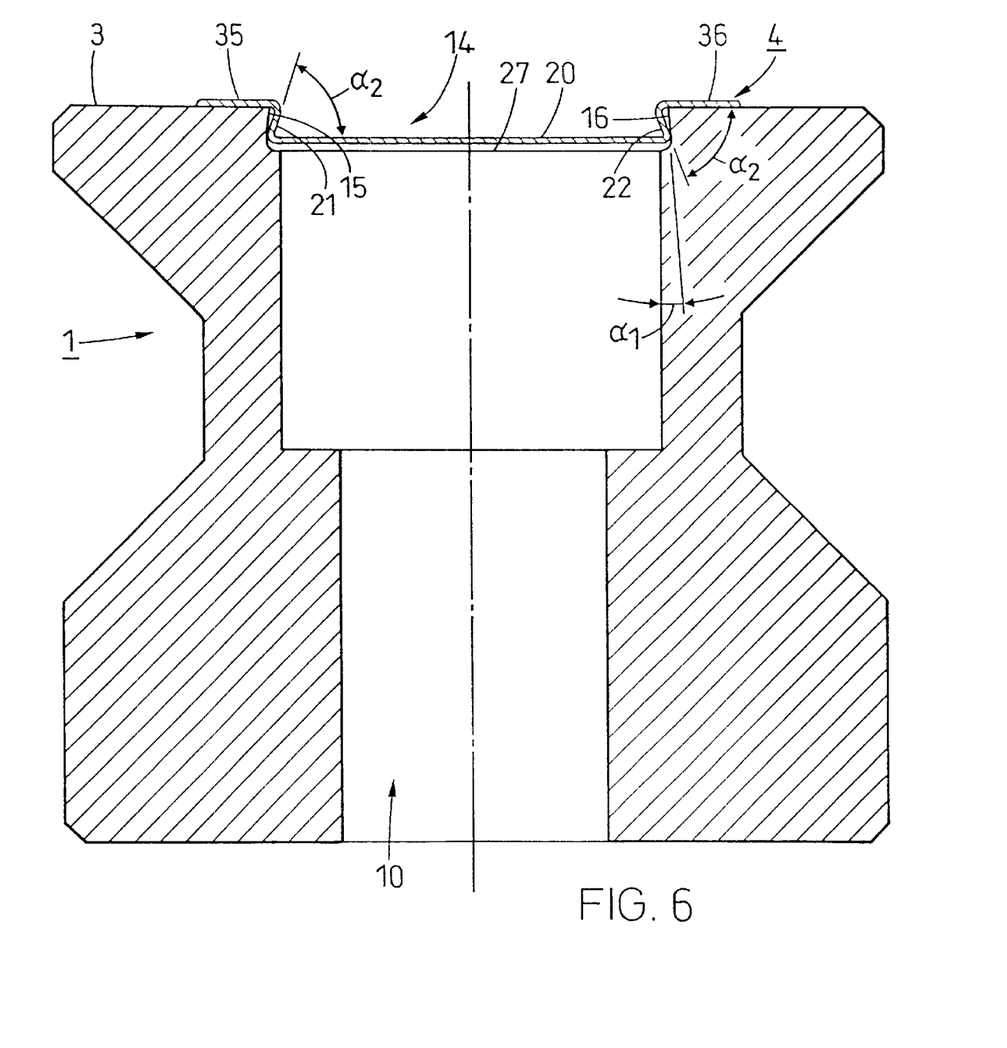
FIG. 6 is a cross-sectional representation of a one-piece cover band according to the invention, attached to a guide rail.

In contrast to the previously shown embodiments, the embodiment of cover band 4, shown in FIG. 6, is embodied as a single sheet metal strip. This sheet-metal strip takes on the function of the fastening as well as cover strip. The cover band has a center section 20, arranged inside the groove 14, which is followed by two clamping legs 21, 22 that point in the direction toward the top surface 3. The center section 20 encloses a sharp bending angle $\alpha_2$ with each of the clamping legs 21, 22, ranging from approximately 82° to 85°. The center section should be slightly wider than the width of the groove bottom. The clamping legs 21, 22 are followed by respectively one cover leg 35, 36, which rests on the top surface 3, outside of the groove 14 and partially covers this top surface.

Since the bending angle $\alpha_2$ is smaller than the angle enclosed by side walls 15, 16 and the groove bottom 27, the clamping legs 21, 22 fit against the side walls 15, 16, but only with the transition region that ranges from the center section 20 to the clamping legs 21, 22. The tension thus created in the cover band causes the center section to be bent slightly upward. The tension also causes the cover band to be pulled automatically into the groove and the cover legs 35, 36 to be pushed against the top surface. Higher production tolerances for the cover band or the groove lead to higher or smaller curvatures of the center section, without reducing the effectiveness of the fastening of the cover band on the guide rail and its function.

Figure 7:
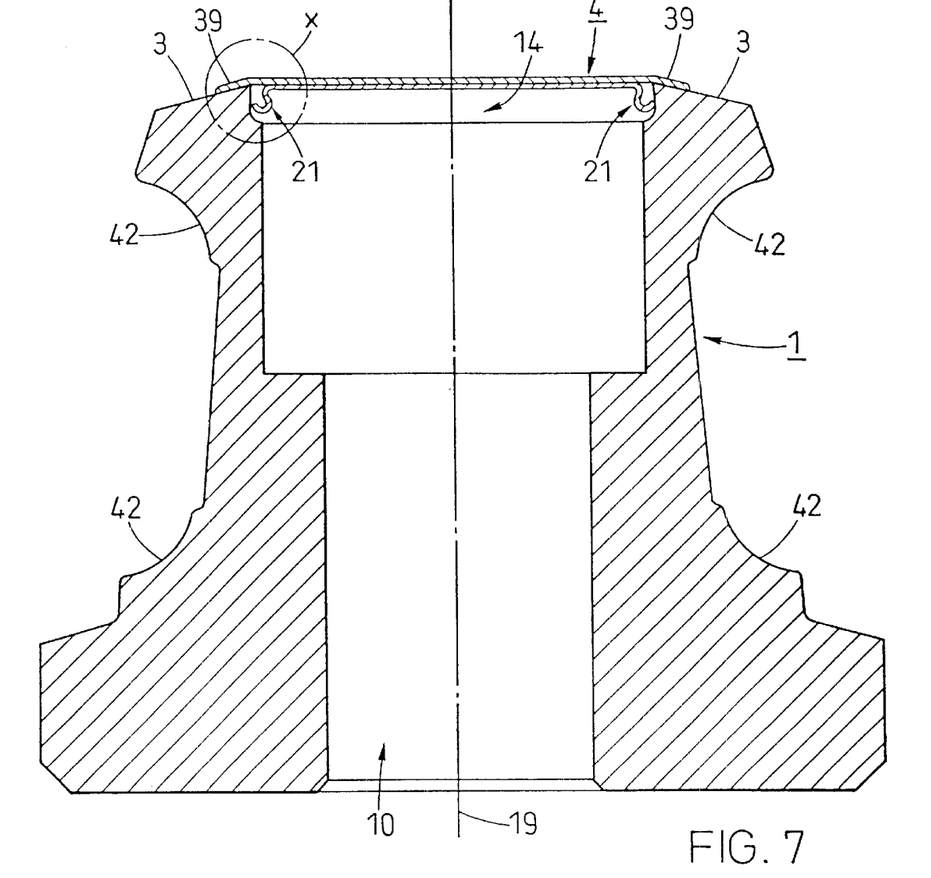
FIG. 7 is a cross-sectional view of a guide rail and cover band for another linear displacement guide according to the invention.
Figure 8:
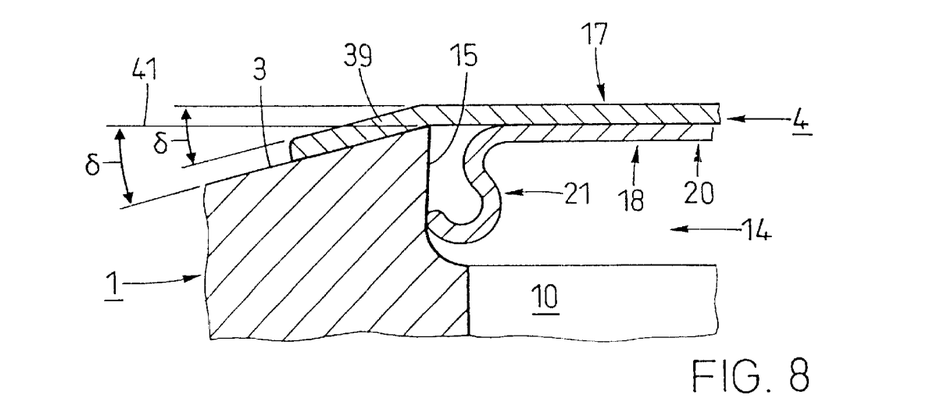
FIG. 8 is a sectional view X from FIG. 7.

An additional exemplary embodiment of a rail 1 and a cover band 4 for a linear displacement guide according to the invention is shown in FIGS. 7 and 8. In the following, only the differences to previous embodiments are mentioned in connection with this embodiment. The fastening strip 18 can be designed in accordance with all previously discussed embodiments. The fastening strip 18 shown for this cover band essentially corresponds to the fastening strip 18 shown in FIG. 2. In contrast to this cover band, the cover strip 17 here has two legs 39 that are bent in the direction of the rail top surface 3. The bending angle δ for each of the two legs is approximately 15°, so that the legs 39 are slanted relative to the center section 20. Of course, different bending angles can be provided for different exemplary embodiments. The edges on the cover strip 17, resulting from the bending, are located approximately above the respective side wall of groove 14. The bent legs 39 rest essentially flat on the rail top surface 3. Relative to an (imaginary) plane 41 that extends orthogonal to a symmetry plane 19, the groove 14 is essentially inclined by the same angle δ (also approximately 15°) in the direction toward the running surfaces 42 for the roller bodies, arranged on the side of rail 1. Finally, the angled legs as shown in FIGS. 7 and 8 can also be provided on a one-piece cover band, as shown in FIG. 6, thus forming a rail covering as shown in these two Figures.

This embodiment according to the invention has the advantage that cooling agents can easily flow off the rail top surface 3 and no cooling agent puddles develop in the region of cover band 4 and the rail top 3. In addition, it is possible to process the rail 1 with fewer processing steps and thus more efficiently than before. The respectively left or right positioned portion of the rail top surface 3, shown in FIG. 7, relative to the symmetry plane 19, can be ground together with running surfaces 42 of the rail, located on the same side, by using a single, correspondingly trimmed grinding disk. A separate operational step for processing the rail top can thus be dispensed with.

Of course, additional embodiments of the clamping connection between the fastening strips and the wall on the sides of the groove are possible as well. It is also conceivable that the two clamping legs of a cover band have a differently designed cross-sectional shape.

What is claimed is:

1. A linear displacement guide, comprising a guide rail and a slide supported via roller elements on the guide rail, said guide rail being provided with a groove extending essentially in a longitudinal displacement direction and is provided with through openings for screws to fasten the rail, wherein the linear displacement guide is provided with a cover means to be arranged on the guide rail, which can be secured to the guide rail to cover the through openings in the region of the groove, wherein the cover means is designed to be a cover band with a center section and two adjoining clamping legs, which are angled relative to the center section, wherein the cover band can be attached to the guide rail by fitting the two clamping legs against the side walls of the groove and wherein the cover band rests with the edge regions outside of the groove on a top surface of the rail.

2. A linear displacement guide according to claim 1, wherein the center setting and the cover band is elastically deformable.

3. A linear displacement guide according to claim 2, wherein the center setting of the cover band forms a curved section when pressure is exerted onto the clamping legs.

4. A linear displacement guide according to claim 1, wherein the width of the cover band is wider than one width of the groove.

5. A linear displacement guide according to claim 1, wherein the cover band has a multi-part design.

6. A linear displacement guide according to claim 5, wherein a separate cover strip is provided with the cover band, which is to be placed on one top surface of the guide rail, and the cover band has a fastening strip that is attached to the cover strip for fastening the cover band inside the groove.

7. A linear displacement guide according to claim 5, wherein the cover band has a two part design.

8. A linear displacement guide according to claim 1, wherein the cover band is provided with at least one cover leg to be placed onto one top surface of the guide rail, and each cover leg is connected as one-piece with the center section to be arranged inside the groove.

9. A linear displacement guide according to claim 1, wherein relative to a direction, which extends transverse to the longitudinal extension of the cover band, respectively one clamping leg follows the center section on both sides and is angled in the direction of the top surface of guide rail, wherein the clamping legs together with the center section respectively enclose a bending angle ($\alpha_2$), and wherein a separate cover leg follows each clamping leg and the respective cover leg extends essentially parallel to the center section and is designed to rest on the top surface of the rail.

10. A linear displacement guide according to claim 1, wherein the groove has a dove-tailed cross section.

11. A linear displacement guide according to claim 1, wherein at least sections of a top surface of the guide rail are slanted toward running surfaces for roller bodies, arranged on the rail.

12. A linear displacement guide according to claim 11, wherein the cover band is provided with legs, which are slanted relative to the center section of the cover band and the legs are provided to rest on the top surface of the rail.

13. A linear displacement guide according to claim 12, wherein the legs, which are slanted relative to the center section, are arranged on a cover strip of a one-piece cover band.

14. A linear displacement guide according to claim 12, wherein the legs are provided to fit flat against the slanted top surface of the rail.

15. A linear displacement guide, comprising a guide rail and a slide supported via roller elements on the guide rail, said guide rail being provided with a groove extending essentially in a longitudinal displacement direction and through openings for screws to fasten the rail, and wherein the linear displacement guide is provided with a cover means to be arranged on the guide rail, which can be secured to the guide rail to cover the through openings in the region of the groove; the cover means is designed to be a cover band with a center section and two adjoining clamping legs, which are angled relative to the center section; the cover band can be attached to the guide rail by fitting the two clamping legs against the side walls of the groove; and the center section of the cover band to be inserted into the groove is provided with a curved section that is directed away from the groove.

16. A linear displacement guide according to claim 15, wherein the cover band, in the region of its side edges, rests on one top surface of the guide rail.

17. A linear displacement guide according to claim 15, wherein the curved section is the result of an elastic deformation of the cover band.

* * * * *